United States Patent
Linsten et al.

(10) Patent No.: US 6,500,870 B1
(45) Date of Patent: Dec. 31, 2002

(54) METHOD FOR MANUFACTURING OF SILICA SOLS

(75) Inventors: Magnus Olof Linsten, Kungälv (SE); Bozena Stanislawa Tokarz, Kungälv (SE); Kenneth Olof Larsson, Göteborg (SE)

(73) Assignee: Akzo Nobel N.V., Arnhem (NL)

( * ) Notice: Subject to any disclaimer, the term of this patent is extended or adjusted under 35 U.S.C. 154(b) by 69 days.

(21) Appl. No.: 09/713,165

(22) Filed: Nov. 15, 2000

Related U.S. Application Data
(60) Provisional application No. 60/166,060, filed on Nov. 17, 1999.

(30) Foreign Application Priority Data

Nov. 17, 1999 (EP) .............................. 99850171

(51) Int. Cl.[7] .......................... C01B 33/141; B01F 3/12
(52) U.S. Cl. ............................. 516/81; 516/84; 516/87; 423/339; 51/308
(58) Field of Search ............................. 516/81, 84, 87; 423/339; 51/308

(56) References Cited

U.S. PATENT DOCUMENTS

| | | | | |
|---|---|---|---|---|
| 3,440,175 A | | 4/1969 | Weldes et al. ................. 516/83 |
| 4,264,564 A | | 4/1981 | Friedemann et al. ......... 423/339 |
| 4,588,421 A | * | 5/1986 | Payne ........................... 51/308 |
| 4,806,665 A | * | 2/1989 | Jones et al. .................. 556/400 |
| 4,915,870 A | * | 4/1990 | Jones .......................... 516/81 |
| 5,230,833 A | * | 7/1993 | Romberger et al. ........... 516/84 |
| 5,783,489 A | * | 7/1998 | Kaufman et al. .............. 51/308 |

FOREIGN PATENT DOCUMENTS

| | | | |
|---|---|---|---|
| EP | 0 464 289 | 1/1992 | ......... C01B/33/143 |
| GB | 2 018 266 | 10/1979 | ............. C07F/7/08 |
| JP | 02-74515 | * 3/1990 | |

OTHER PUBLICATIONS

Derwent Database on EAST, week 199805, London: Derwent Publications Ltd., AN 1990–127334, Class D13, JP 02074515 A, (Fuji Davidson Chem Ltd) abstract.*

Yaguchi Kazuhiko, *Patent Abstracts of Japan*, 02074515, dated Mar. 14, 1990.

Batura Z E, et al., *Abstract*, SU1726381, dated 1993, week 199313.

*The Chemistry of Silica*, Iler R., 1979, Month unknown, pp. 174–177, 332–335 and 464–467.

* cited by examiner

*Primary Examiner*—Daniel S. Metzmaier
(74) *Attorney, Agent, or Firm*—Lainie E. Parker

(57) ABSTRACT

A method for production of high purity silica sols comprising the steps: (a) adding a phosphonic acid-based complexing agent to the silicic acid-containing solution forming complexes with metal cations present in said solution; (b) forming in said silicic acid-containing solution a precipitation containing phosphonic acid-based complexing agent and metal cations; (c) removing the precipitation from the solution; and, (d) polymerising the silicic acid in the solution to obtain a silica sol. The invention also relates to silica sols containing at least one phosphonic acid-based complexing agent.

9 Claims, No Drawings

METHOD FOR MANUFACTURING OF SILICA SOLS

This application claims priority of European Patent application No. 99850171.2, filed Nov. 17, 1999, and U.S. Provisional Patent Application No. 60/166,060, filed Nov. 17, 1999.

The present invention relates to a method for manufacturing of high purity silica sols. More specifically, the invention relates to a method of manufacturing of high purity silica sols involving use of phosphonic acid-based complexing agents.

BACKGROUND OF THE INVENTION

Silica sols have been known for decades and are nowadays used in a great variety of applications such as in the paper production, coatings, catalysts, anti-skid products, polishing agents for various industries including the electronic industry, especially for wafer polishing. In many applications, the use of silica sols contaminated with traces of transition metals, alkali and alkaline earth metals, aluminum and the like have often caused problems. The presence of these metals, also in small amounts, interfere which leads to poorly performing silica sols.

Presence of e.g. contaminating metals like alkali metals such as Na, K, alkaline earth metals like Ca and Mg, transition metals such as Fe, Cu, Mn, Ni, Zn and the like are harmful when present in silica sols. Especially, aluminum is known to cause severe problems when present in the silica sol.

It has thus been elaborated various methods to prepare silica sols, having low contents of the mentioned contaminating metals.

Previous methods to produce silica sols have involved treatment of silicic acid solutions, derived from alkali metal silicates by use of various types of complexing agents such as EDTA and oxalic acid to reduce the contents of the above-mentioned disturbing metal cations.

EP-B1-464 289 discloses a method for preparation of a purified silica sol. In this method, an alkali metal silicate solution is first diluted in water, then exposed to a strong cation exchange resin to remove sodium ions from a sodium silicate solution thus forming a silicic acid solution to which oxalic acid is added. The oxalic acid is believed to form anionic complexes with metal ions, especially iron ions in the silicic acid solution. These complexes can be removed from the solution by means of an anion exchange step. Yet another cationic exchange step is required to remove remaining metal cations from the solution. The silicic acid solution is then subjected to polymerisation to form a silica sol.

The method according to EP-B1-464 289 yields some reduction in metal cations, e.g. Al, Fe, in the silicic acid solution. One drawback with the method according to EP-B1-464 289 is that a strong anionic resin must be used to separate the oxalate metal complexes. This will require regeneration of the anion exchange resin before it can be reused. Furthermore, multiple exchange steps increase the risk of contamination.

Manufacturing of high purity silica sols from fused silica or silicon metal is also known in the art. Fused silica and silicon metal are, however, highly priced raw materials which make the production very expensive.

The present invention provides for an inexpensive and effective way to produce high purity silica.

SUMMARY OF THE INVENTION

The invention is a method for producing high purity silica sols using a phosphonic acid-based complexing agent, and the high purity silica sols produced therefrom.

DETAILED DESCRIPTION OF THE INVENTION

According to the present invention, a new method for manufacturing of high purity silica sols has been provided. The new method involves treating a silicic acid-containing solution by adding a phosphonic acid-based complexing agent to the solution, forming a precipitate of complexes of phosphonic acid-based complexing agent and metal cations, removing said complexes whereafter the silicic acid can be subjected to polymerisation. The invention is further defined in the appended claims.

More specifically, the method for the manufacturing of high purity silica sols from a silicic acid-containing solution comprises the following steps:

(a) adding a phosphonic acid-based complexing agent to the silicic acid-containing solution forming complexes with metal cations present in the solution;

(b) forming in said silicic acid-containing solution a precipitation containing phosphonic acid-based complexing agent and metal cations;

(c) removing the precipitation from the solution; and, (d) polymerising the silicic acid in the solution to obtain a silica sol.

The silicic acid-containing solution of step (a), has a $SiO_2$-concentration of from about 1 to about 20%, preferably containing from about 4 to about 10 weight % $SiO_2$, most preferably from about 5 to about 7 weight % $SiO_2$ and having a pH of from about 1 to about 4.5, preferably from about 1.5 to about 4, most preferably from about 2 to about 3, can be prepared in any known way from any alkali metal silicate including potassium silicate, sodium silicate, and lithium silicate or mixtures thereof. The alkali metal silicates are well known in the art of silica sol manufacturing and are available in various grades. Preferably, the alkali metal silicate used for production of silica sol will be sodium silicate which will be further described herebelow. In case other alkali metal silicates will be used, the same processing steps will be applicable.

Suitably, sodium silicates have a $SiO_2:Na_2O$ molar ratio of from about 1 to about 5, preferably from about 3 to about 4. The silicic acid-containing solution can be obtained by increasing the $SiO_2:Na_2O$ molar ratio of the silicate solution. This can be performed by cation exchange, as described in The Chemistry of Silica, Iler, R. 1979 pages 333–334, preferably by contacting a sodium silicate-containing solution with a strong cation exchange resin to yield a silicic acid-containing solution. The silicic acid is presumed to comprise an aqueous solution of one or several units of $Si(OH)_4$ linked together.

Before the cation exchange step is performed, the sodium silicate solution is suitably diluted. Normally, the cation exchange step will dilute the alkali metal silicate solution further as water can be added during the cation exchange treatment thus yielding a lower $SiO_2$-concentration.

Phosphonic acid-based complexing agents added in step (a) refer to phosphonic acids and salts thereof. The phosphonic acid-based complexing agents are capable of forming complexes with harmful metal cations, e.g. Al, Ca, Cr, Fe, Ti, Zr present as impurities in the silicic acid-containing solution.

Any phosphonic acid-based complexing agents soluble in the silicic acid-containing solution can be used as a complexing agent.

The phosphonic acid-based complexing agent may be added to the silicic acid-containing solution in acidic form, as a salt, or a mixture of salts.

Examples of useful phosphonic acid-based complexing agents include ethylene diamine tetra (methylene phosphonic acid), hexamethylene diamine tetra(methylene phosphonic acid), diethylene triamine penta(methylene phosphonic acid), 2-phosphonobutan-1,2,3-tricarboxylic acid, propylene diamine tetra methylene phosphonic acid)(N,N,N',N'-tetra (phosphonomethyl)-1,2-diaminopropane(PDTP), 2-hydroxyethyl iminobis(methylene phosphonic acid), 2-ethylhexyl iminobis(methylene phosphonic acid), n-oktyliminobis(methylene phosphonic acid), cyclohexane-1,2-diaminetetrakis(methylene phosphonic acid), cyclohexane,1,2-diaminetetrakis(methylene phosphonic acid), pentaethylenehexamineoctakis(methylene phosphonic acid), N,N-bis(3-aminopropyl)amine hexakis(methylene phosphonic acid), glycine-N,N-di(methylene phosphonic acid), N-(2-hydroxyethyl)-N,N-di(methylene phosphonic acid), aminotris(methylene phosphonic acid), and acetodiphosphonic acid, and salts thereof.

Preferably, aminotris(methylene phosphonic acid) (ATMP) (also named nitrilotris(methylene phosphonic acid)) and (acetodiphosphonic acid(ADPA) (also named 1-hydroxyethane 1,1-diphosphonic acid) or mixtures of these phosphonic acid-based complexing agents are added to the silicic acid-containing solution.

It has been found that the formation of complexes and precipitation according to step (b) normally is optimal at a pH from about 1.2 to about 2.2, preferably from about 1.6 to about 2, most preferably from about 1.7 to about 1.9. Normally, the suitable pH value can be obtained by addition of an appropriate amount of phosphonic acid-based complexing agents, but if necessary the pH value can also be adjusted by addition of any acid or base not disturbing the process, such as phosphoric acid, diphosphoric acid, triphosphoric acid, phosphonic acid, diphosphonic, phosphonic acid and other phosphorous based acids.

Precipitation of complexes of metal cations and phosphonic acid-based complexing agents can thus be formed. Suitably, the formation of the precipitation in step (b) is carried out by ageing the solution while having the preferred pH value maintained. The formation of complexes starts almost immediately. The silicic acid-containing solution will normally turn turbid directly after the addition of phosphonic acid-based complexing agents. Usually, the initiation of precipitation can be observed after a few minutes. The process can be performed until the precipitation of the phosphonic complexes is complete. The ageing preferably is carried out for at least about 5 minutes, most preferably at least about 2 hours before the formed precipitation is removed from the solution. Usually, only 2–3 hours is enough but more time may be required before the removal of the formed complexes of the phosphonic acid-based complexing agents and the metal cations will take place, e.g. up to about 10 hours or more. When the precipitation is complete, the turbid solution will turn clear. Precipitation of e.g. Al, Fe, Ca and Zr together with the phosphonic acid-based complexing agents will occur during the ageing process resulting in a purified silicic acid-containing solution.

Means of removal of the precipitation in step (c) may include any known separation method such as filtration, decantation, or centrifugation, or combinations thereof, but also other conventional separation methods for removing formed precipitation known in the art may be considered.

Preferably, at least a portion of the cations remaining in the silicic acid-containing solution after step (c) is removed e.g. by means of ion exchange, suitably by means of a strong cation exchange resin.

It may also be desirable to remove at least a portion of the phosphonic acid-based complexing agents. This can be effected e.g. by means of ion exchange, suitably by means of a strong anion exchange resin after step (c) by means of an anion exchange resin, preferably a strong anion exchange resin. This removal step may also be omitted to retain more phosphonic acid-based complexing agents in the silica sol.

The optional cation and anion exchange steps may be carried out in any order. The cation and anion exchange step may even be integrated and carried out simultaneously by use of a prepared column containing both cation and anion exchange resin.

The temperatures in steps (a)–(c) are normally from about 5 to about 40° C., preferably from about 15 to about 30° C.

Polymerisation of the silicic acid in the solution in step (d) can then be performed according to a conventional polymerisation method, e.g. as described in The Chemistry of Silica, Iler, R. 1979 pages 174–176, comprising addition of the silicic acid solution to an alkaline solution, suitably having a pH of from about 7 to about 11. An example of such a method is disclosed in U.S. Pat. No. 3,440,175, hereby incorporated by reference. The solution is suitably heated, preferably to a temperature from about 80 to about 100° C., most preferably from about 95 to about 100° C., to start the polymerisation. The polymerisation process may take up to about 10 hours or more, preferably between 4–5 hours.

Through the invention, it is possible to produce highly pure silica sols. In a 10 weight % $SiO_2$ sol, the content of Al is preferably below 65 ppm, most preferably below 30 ppm, Ca preferably below 15 ppm, most preferably below 10 ppm, Na preferably below 700 ppm, most preferably below 100 ppm, Fe preferably below 15 ppm, most preferably below 10 ppm, Ti preferably below 15 ppm, most preferably below 10 ppm, and Zr preferably below 12 ppm, most preferably below 10 ppm. All values refer to ppm by weight and can be determined by inductive coupled plasma (ICP). In more concentrated or diluted silica sols, the level of impurities will increase or decrease proportionally to the $SiO_2$ content.

The invention further concerns a silica sol comprising at least one phosphonic acid-based complexing agent, suitably in an amount from about 10 to about 50000 ppm based on a 10 weight % silica sol, preferably from about 100 to about 10000 ppm, most preferably from about 1000 to about 7000 ppm. The presence of phosphonic acid-based complexing agents is advantageous in certain applications, e.g. wafer polishing. The silica sol containing phosphonic acid-based complexing agents can be prepared by the method as described above, but with phosphonic acid-based complexing agents remaining in the solution after separation of the precipitation. The phosphonic acid-based complexing agents are not removed or are only partly removed from the solution. The content of impurities in the phosphonic acid-based complexing agent-containing silica sol is preferably low as described above. Concerning other suitable and preferred features of the silica sol, such as choice of phosphonic acid-based complexing agents, the above description of the method is referred to.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. While the examples here below provide more specific details of the reactions, the following general principles may here be disclosed. The following example will further illustrate how the described invention may be performed without limiting the scope of it.

All parts and percentages refer to part and percent by weight, if not otherwise stated.

step was performed by means of a strong anion exchange resin of quaternary ammonium type to remove remaining phosphonic acid-based anions. The second cation exchange step further reduced the contents of metal cations. The polymerisation was performed as in example 1. The obtained product was stabilised by ammonia to a pH of 9.5 and concentrated by means of ultrafiltration to 50 weight %. A high purity silica sol was produced.

The table below shows the degree of purity in the prepared high purity silica sols of examples 1–2 compared to a standard silica sol. As can be seen, the method according to the examples provides for exquisite purity of the silica sol.

| content (ppm) in 10 weight % $SiO_2$ sol | Al | Ca | Fe | Na | Ti | Zr | Phosphonic acid-based anions, expressed as ppm by weight $PO_4$ |
|---|---|---|---|---|---|---|---|
| Standard sol | 65–75 | 10–15 | 15–25 | 700–1000 | 15–25 | 10–12 | — |
| Example 1 | 10 | 7 | 6 | 38 | <2 | <3 | 4230 |
| Example 2 | 6 | 4 | <2 | 20 | <2 | <3 | 50 |

EXAMPLE 1

A dilute Na silicate solution was made using water having a conductivity of 20–40 mS/cm. The $SiO_2$ content was 5.6 weight %. The solution was passed through a strong cation exchange resin of sulphonate type. A silicic acid-containing solution was obtained containing about 5 weight % $SiO_2$. The pH was 2.2.

The silicic acid solution was supplied under mixing with a 50% solution of aminotris (ethylene phosphonic acid) (ATMP) yielding a pH of 1.8. In this experiment, 7 g of ATMP was added to 1 kg of 5.5 weight % silicic acid.

After addition of the ATMP, the solution was left for ageing at room temperature. The solution turned turbid within 30 minutes and after several hours, a white precipitate could be observed on the bottom of a beaker and a clear phase above it.

The content of the beaker was slightly agitated and passed through a 5 µm filter to separate the precipitate from the clear phase. After this stage, the metal contents of the silicic acid solution was considerably reduced.

The obtained clear filtrate was passed through a column with a strong cationic resin of sulphonate type to further reduce the metal contamination.

The purified silicic acid solution was then used for polymerisation to form silica sol particles in the presence of phosphonic acid-based anions. KOH solution was used to alkalise the solution throughout the polymerisation process. The temperature was kept at 95–98° C. The pH was kept at 8–8.5. The obtained silica sol had a pH of 8, a concentration of 10 weight %. The average particle size was 34 nm, based on surface area measurements as described in The Chemistry of Silica, Iler, R. 1979 pages 465–466 and the particle size distribution was 15–100 nm, determined by dynamic light scattering, DLS. The obtained product was then concentrated to 30 weight %.

EXAMPLE 2

Example 2 was conducted as example 1 except that the cation exchange step was followed by an anion exchange step and a second cation exchange step. The anion exchange

What is claimed is:

1. A method for the manufacturing of high purity silica sol from an aqueous silicic acid-containing solutions, the method comprises the following steps:

(a) adding a phosphonic acid-based complexing agent to the silicic acid-containing solution forming complexes with metal cations present in said solution;

(b) forming in said silicic acid-containing solution a precipitation containing phosphonic acid-based complexing agent and metal cations by ageing the solution;

(c) removing the precipitation from the solution: and, (d) polymerising the silicic acid in the solution to obtain a silica sol.

2. A method as claimed in claim 1, wherein the phosphonic acid-based complexing agent is at least one of aminotris (methylene phosphonic acid) or 1-hydroxyethane 1,1-diphosphonic acid or salts thereof.

3. A method as claimed in claim 1, wherein the ageing is carried out for at least about 5 minutes.

4. A method as claimed in claim 1, wherein ageing of the solution is carried out for at least about 2 hours.

5. A method as claimed in claim 1, wherein the pH of the silicic acid-containing solution during step (b) is maintained at from about 1.2 to about 2.2.

6. A method as claimed in claim 1, wherein the pH of the silicic acid-containing solution during step (b) is from about 1.7 to about 1.9.

7. A method as claimed in claim 1, wherein after step (c) at least a portion of any remaining cations is removed by ion exchange.

8. A method as claimed in claim 1, wherein after step (c) at least a portion of any remaining phosphonic acid-based complexing agents is removed by ion exchange.

9. A method as claimed in claim 1, wherein the temperature during step (b) is from about 5 to about 40° C.

* * * * *